United States Patent [19]

Damico

[11] Patent Number: 4,703,089

[45] Date of Patent: Oct. 27, 1987

[54] STRUCTURAL ADHESIVE FORMULATIONS

[76] Inventor: Dennis J. Damico, 4878 Old Sterrettania Rd., Erie, Pa. 16506

[21] Appl. No.: 598,736

[22] Filed: Apr. 10, 1984

[51] Int. Cl.[4] .................... C08F 279/02; C08F 283/04
[52] U.S. Cl. .................................. 525/245; 525/261; 525/455; 526/301
[58] Field of Search ............... 523/176; 524/172, 167; 525/245, 17, 261, 455; 526/301

[56] References Cited

U.S. PATENT DOCUMENTS

| | | | |
|---|---|---|---|
| 3,616,366 | 10/1971 | Passalenti | 525/17 |
| 3,855,040 | 12/1974 | Malofsky | 526/301 |
| 3,890,407 | 6/1975 | Briggs | 525/245 |
| 3,954,714 | 5/1976 | Kuehn | 526/301 |
| 4,147,675 | 4/1979 | Aritomi | 525/17 |
| 4,460,760 | 7/1984 | Okamoto | 526/301 |
| 4,554,322 | 11/1985 | Kwiecinski | 525/245 |

FOREIGN PATENT DOCUMENTS

| | | | |
|---|---|---|---|
| 650601 | 10/1962 | Canada | 525/17 |

OTHER PUBLICATIONS

Kleinberg et al, *Inorganic Chemistry;* D.C. Heath and Co.; Boston; 1960; p. 487.

Brewster, *Organic Chemistry,* 3rd ed, p. 533; Prentice-Hall, N.J. 1961.

*Primary Examiner*—C. Warren Ivy

[57] ABSTRACT

A one-component adhesive for metal surfaces such as iron, zinc, copper, cadmium and their alloys will cure upon contact with the metal surface. The adhesive composition includes olefinically unsaturated monomer; reactive or non-reactive polymer; an acidic material; a compound containing sulfonyl halide group; and a compound containing a transition metal. The adhesive composition cures rapdily upon contact with a metal surface to form an adhesive bond between the surfaces. The adhesive composition is especially useful as a threadlock adhesive, and as an adhesive for bonding structural components.

4 Claims, No Drawings

STRUCTURAL ADHESIVE FORMULATIONS

The present invention relates to structural adhesive compositions. More particularly, the invention relates to shelf-stable, one-package acrylic structural adhesive compositions which are curable at ambient temperature conditions.

Acrylic structural adhesives are well-known articles of commerce which are extensively used commercially for bonding metal and plastic materials. The acrylic adhesives typically comprise a mixture of one or more olefinically-unsaturated reactive monomers and curing agents, with cure or polymerization being effected through a free radical or ionic polymerization mechanism. The adhesives preferably contain one or more polymeric materials which may or may not be reactive, that is, capable of being polymerized per se or at least capable of interpolymerizing with the reactive monomers, such as grafting onto or crosslinking the growing polymers from the reactive monomer polymerization. In addition, the adhesives can contain other additives for improving adhesion to substrate materials, environmental resistance, impact strength, flexibility, heat resistance, and the like.

The polymerization (cure) of either type of acrylic structural adhesive can be initiated by free radical generators, such as peroxygen compounds, usually in combination with accelerators to increase the rate of free radical formation. It has been long recognized, in those applications where at least one substrate was a metal surface, that at least certain metals, such as iron, copper, tin, aluminum, silver and alloys of such metals, exhibited a catalyst effect upon the cure, which was not always positive, that is, in some instances, the metal substrate tended to poison the desired reaction.

There have been many attempts to utilize the catalytic effect of metals. For example, it has been proposed to pretreat non-catalytic surfaces with a catalytic salt solution, such as the resinates of iron, copper or cobalt, see Lees U.S. Pat. No. 3,658,254, column 1, lines 29-52. The Lees patent itself is directed to two-package anaerobic acrylic adhesive compositions whose effectiveness was not influenced by the catalytic or non-catalytic character of the substrate. Skoultchi, in U.S. Pat. Nos. 3,880,956 and 3,957,561 dicloses anaerobic acrylic adhesive compositions which are activated by contact with metal surfaces. The compositions of Skoultchi U.S. Pat. No. 3,880,956 are single-package anaerobic compositions containing diazonium salt catalysts which cure through a free radical polymerization mechanism when excluded from air or oxygen and in contact with ceratin metal surfaces such as iron, copper, tin, aluminum, silver, alloys of these metals and cadmium, chromium, nickel and zinc chromate platings. Skoultchi U.S. Pat. No. 3,957,561 discloses one-package anaerobic compositions utilizing a two-component catalyst system comprising at least one diazosulfone compound and o-sulfobenzimide which cure through a free radical polymerization mechanism when the adhesive is excluded from air or oxygen and in contact with active metal surfaces (the same surfaces described in Skoultchi '956). On the other hand, Skoultchi, in U.S. Pat. No. 4,052,244 utilized copper in the form of a copper salt of saccharin or p-toluenesulfonic acid to provide two-package anaerobic adhesives whose cure was otherwise not dependent on substrate composition. In another development, Skoultchi, in U.S. Pat. No. 4,081,308 dicloses two-package adhesives which utilize, in one package, copper sacchrinate or saccharin in combination with a soluble copper salt, and, in the other package, an alpha-hydroxy sulfone, an alpha-aminosulfone or mixtures of such sulfones, as catalytic agents for the free radical curing of the anaerobic acrylic adhesive compositions. The cure of the Skoultchi U.S. Pat. No. 4,081,308 compositions is independent of substrate composition.

The present invention provides novel one-package acrylic adhesives which cure at ambient temperatures when brought into contact with certain metal surfaces, whether or not air or oxygen is excluded. In particular, the single-package adhesive compositions of this invention comprise, in admixture, (A) at least one olefinically unsaturated monomer;
(B) at least one polymeric material selected from the group consisiting of
  (1) at least one olefinically unsaturated urethane reaction product of at least one isocynate-functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
  (2) at least one butadiene-based elastomeric polymeric material selected from the group consisting of
    (a) homopolymer of butadiene;
    (b) copolymer of butadiene and at least one monomer copolymerizable therewith selected from the group consisting of styrene, acrylonitrile, methacrylonitrile and mixtures thereof;
    (c) modified elastomeric polymeric material selected from the group consisting of butadiene homopolymer and copolymer as previously defined, such as homopolymer and copolymer having been modified by copolymerization therein by trace amounts up to 5 percent by weight, based on weight of modified elastomeric material, of at least one functional monomer; and
    (d) mixtures thereof;
  (3) at least one polymer-in-monomer syrup consisting essentially of
    (a) from 10 to 98 percent by weight of at least one olefinically unsaturated monomeric compound having at least one group;
    (b) from 2 to 90 percent by weight of at least one polymer derived from such (3)(a) monomers;
    (c) from zero to 30 percent by weight of at least one polymer containing the group $(CH_2-CCl=CHCH_2)_n$, wherein n is an integer; wherein (3)(b) is present as a partial polymerization product of (3)(a) or of (3)(a) in the presence of (3)(c); the mixture of (3)(a) and (3)(b) or of (3)(a), (3)(b) and (3)(c) being a syrup of polymer dissolved or dispersed in unpolymerized monomer, in which syrup the amount of (3)(b) derived from (3)(a) is in the range from 2 to 90 percent, based on the total weight of (3)(a), (3)(b) and (3)(c);
  (4) at least one polymeric material selected from the group consisting of polyvinyl alkyl ether, styrene-acrylonitrile resin, unsaturated polyester resin and mixtures thereof, the alkyl moiety of such ether containing from one to 8 carbon atoms;
  (5) at least one homopolymer of copolymer of at least one olefinically unsaturated monomer selected from the group consisting of styrene and alkyl or hydroxyalkyl esters of acrylic and methacrylic acid, said ester having one to 18 carbon atoms in the alkyl moiety; and (6) mixtures of such polymeric materials;

(C) an acidic compound having at least one organic or inorganic acid group;

(D) at least one compound containing at least one sulfonyl halide group having the structure

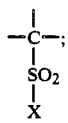

wherein X is selected from the group consisting of chlorine, bromine, or iodine, with chlorine being currently preferred; and (E) at least one organic or inorganic compound containing at least one reducible transition metal, said metal having its valence electrons in a "d" subshell, said metal being selected from the elements of classes Ib, IIb, IIIb, IVb, Vb, VIb, VIIb, or VIII on the periodic chart of the elements; with copper, zinc, iron, cobalt and nickel being preferred, with copper being especially preferred, said metal being most preferably in its highest oxidation state;

wherein the amount of said olefinically unsaturated monomer is in the range from 10 to 90, preferably 17 to 87, percent by weight; the amount of said olefinically unsaturated urethane reaction product is in the range from 10 to 90, preferably 13 to 83, percent by weight; the amount of such butadiene-based elastomeric polymeric material is in the range from 1 to 30, preferably 7 to 27, percent by weight; the amount of such polymer-in-monomer syrup is in the range from 2 to 60, preferably 5 to 60, percent by weight; the amount of said polyvinyl alkyl ether, styrene-acrylonitrile resin or unsaturated polyester resin is in the range from 5 to 75, preferably 15 to 75, percent by weight; the amount of said homopolymer or copolymer of at least one of styrene and esters of acrylic or substituted acrylic acids is in the range from 2 to 60, preferably 5 to 60, percent by weight; the amount of said acidic compound is in the range from 0.05 to 20, preferably 0.1 to 15, percent by weight; the amount of said sulfonyl halide-containing compound is in the range from 0.05 to 5, preferably 0.5 to 2, percent by weight; and the amount of said transition metal compound is in the range from 0.05 to 5, preferably 0.5 to 2.5, percent by weight; said weight percents being based on the total weight of ingredients (A)–(E), inclusive.

The adhesive compositions of the invention can optionally contain up to 60, preferably not more than 30, percent by weight, based on total weight of the adhesive composition, of at least one polymeric material having an intrinsic viscosity in the range from 0.1 to 1.3, such polymeric material being obtained from the polymerization or copolymerzation of at least one styrene monomer, acrylic monomer, substituted acrylic monomer, olefinically-unsaturated non-acrylic monomer, or mixtures thereof; up to 40, preferably not more than 30, percent by weight, based on total weight of the adhesive composition, of at least one elastomeric material having a second order glass transition temperature below 5° C.; and up to 10 percent by weight of at least one unsaturated dicarboxylic acid ester. The latter recited optional ingredient is based also on the total weight of the adhesive composition.

DESCRIPTION OF THE PREFERRED EMBODIMENTS

According to the present invention, an adhesive composition is provided which may be employed to bond metal surfaces together. The adhesive exhibits good bonding properties with zinc, copper, cadmium, iron, tin, aluminum, silver, chromium, alloys of such metals metallic coatings or platings of such metals. The surfaces of these metals, alloys and metallic platings can, for convenience be called "active surfaces" and this term is to be understood to include but not be limited to the mentioned metal specie. The adhesive exhibits good weathering characteristics. Adhesive compositions prepared according to this invention are useful as a thread lock material to be applied to the threads of a threaded fastener to form a tight bond between the fastener and its threaded receiving member, e.g., a bolt and nut. Other adhesive compositions prepared according to the invention are useful in the construction of building panels where the bonding of galvanized steel sheets to galvanized steel sheets is desired, as well as in bonding such galvanized sheets to other structural members. The use of structural fasteners avoids the need for unsightly weld marks, exposed thread fasteners, exposed rivets, etc. Structural adhesives may be substituted in part for other mechanical fasteners, for example, in the transportation industry where exterior panels are secured to frame members or to other panel members by means of exposed fasteners, such as rivets, threaded fasteners, welding, etc. A number of the welds, rivets or threaded fasteners can be eliminated and their function can be performed by appropriate reliable structural adhesives in accordance with the present invention.

Monomeric liquid olefinically unsaturated compounds suitable for use in the adhesive compositions of the invention are characterized by the presence of at least one

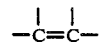

group. The olefinically unsaturated group is preferably a vinyl group, more preferrably terminally located, with acrylic and substituted acrylic monomers being currently preferred. When olefinically unsaturated monomers which do not contain acrylic or substituted acrylic groups are employed, they should be used in an amount not exceeding 50, preferably not more than 25, percent by weight, based upon the total weight of the adhesive composition. Representative olefinically unsaturated monomers include, without limitation, methyl methacrylate, butyl methacrylate, ethyl acrylate, diethylene glycol dimethacrylate, methacrylic acid, acrylic acid, acrylonitrile, methacrylonitrile, styrene, vinyl styrene, vinyl acetate, chlorostyrene, glycidyl methacrylate, itaconic acid, acrylamide, methacrylamide, vinylidene chloride, 2,3-dichloro-1,3-butadiene, 2-chloro-1,3-butadiene, methylstyrene and n-butylstyrene.

The isocyanate-functional prepolymers which are employed to form olefinically unsaturated urethane reaction products for use in the practice of the invention are well known. Typically, such prepolymers are adducts or condensation products of polyisocyanate compounds having at least 2 free isocyanate groups and monomeric or polymeric polyols having at least two hydroxy groups, including mixtures of such polyols. The reaction between the polyisocyanate and the polyols is effected employing an excess amount of polyisocyanate to ensure that the reaction product will contain at least 2 free, unreacted isocyanate groups.

Polyols useful in preparing isocyanate-functional prepolymer used in the present invention preferably have an average molecular weight of 300 to 3,000. Suitable polyols include polyalkylene glycols such as polyethylene glycols; polyetherpolyols such as those prepared by addition polymerization of ethylene oxide and a polyol such as trimethylol propane in a ratio to provide unreacted hydroxyl groups in the product; organic hydroxylated elastomers exhibiting second order glass transition temperatures below about 5° C. such as poly(butadienestyrene) polyols and poly(butadiene) polyols; polyester polyols such as are prepared by polymerizing polyols, such as diethylene glycol, trimethylol propane or 1,4-butanediol, with polycarboxylic acids, such as phthalic, terephthalic, adipic, maleic or succinic acids, in a ratio to provide unreacted hydroxyl groups in the product; glyceride esters of hydroxylated fatty acids such as castor oil, glycerol monoricinoleate, blown linseed oil and blown soya oil; and polyesterpolyols such as are prepared by the polymerization of a lactone such as $\epsilon$ caprolactone.

Polyisocyanates which can be reacted with polyols to form isocyanate-functional prepolymers for use in the present invention can be any monomeric; that is, non-polymeric, isocyanate compound having at least 2 free isocyanate groups, including aliphatic, cycloaliphatic and aromatic compounds. Representative polyisocyanates include, without limitation thereto, 2,4-tolylene diisocyanate, 2,6-tolylene diisocyanate, 4,4'-diphenylmethane diisocyanate, m- and p-phenylene diisocyanate, polymethylene poly(phenyl isocyanate), hexamethylene diisocyanate, 4,4'-methylene-bis(cyclohexyl isocyanate), hexamethylene diisocyanate, 4,4'-methlene-bis(cyclohexyl isocyanate), isophorone diisocyanate, and other aliphatic cycloaliphatic and aromatic polyisocyanates, and including mixtures of such polyisocyanates. Currently, cycloaliphatic and aromatic polyisocyanates are preferred.

Hydroxy-functional compounds which can be employed to introduce olefinic unsaturation into the isocyanate-functional prepolymer include, without limitation, hydroxyethyl acrylate, hydroxyethyl acrylate, hydroxyethyl methacrylate, and allyl alcohol.

The butadiene-based elastomeric polymeric materials which are suitable for use in the practice of this invention are also well-known and can be any elastomer derived from 1,3-butadiene or its halogenated analogs which has a glass transition temperature below ambient temperature and preferably not above about 5° C. Suitable elastomers include butadiene homopolymer, copolymers of butadiene with styrene, acrylonitrile and methacrylonitrile, and such homopolymers and copolymers modified by copolymerization therein of trace amounts (0.05 to 5%) of a functional comonomer, such as acrylic acid, methacrylic acid, maleic anhydride, fumaric acid, styrene and methyl methacrylate.

Polymer-in-monomer syrups suitable for use in the present invention, compositionally as well as their preparation, are well-known in the art. Representative syrups, including precursor liquid monomer compounds containing at least one olefinically unsaturated group, and their preparation are disclosed in U.S. Pat. Nos. 3,333,025; 3,725,504; and 3,873,640. Briefly, such syrups are conveniently prepared by de-aerating the starting mixture consisting essentially of at least one polymerizable liquid olefinically unsaturated compound and, when used, polymer containing the group $(CH_2-CCl=CHCH_2)_n$, for a short period at about 40° C. under vacuum and then heating the mixture to about 75° C. under an inert gas atmosphere. A catalyst, for example, a free radical-generating catalyst such as benzoyl peroxide or azodiisobutyric acid dinitrile, is then added, preferably in the form of a solution. The quantity of catalyst added is such that it will be completely consumed when the desired viscosity is reached. After the reaction is completed, the polymer-in-monomer syrup is cooled. Preferably, the syrups have a viscosity in the range from about 500 to about 1,000,000 mPa's at 20° C.

Polymers containing the grouping $(CH_2-CCl=CHCH_2)_n$, wherein n is an integer, are well-known in the art under the name neoprene, which is produced by the polymerization of 2-chloro-1,3-butadiene. Further elucidation would be superfluous.

Polyvinyl alkyl ethers suitable for use in the adhesive compositions which are described herein are well-known in the art. Such ethers will preferably contain one to 8, more preferably one to 4, carbon atoms in the alkyl moiety of said ether. Likewise, styrene-acrylonitrile polymers which are suitable for use in the invention are well-known.

Elastomeric polymeric materials having second order glass transition temperatures below about 5° C. can be effective in modifying room temperature flexibility of the adhesive bond. Especially preferred of such elastomers are polychloroprene rubber; polybutadiene rubber; butadiene copolymer rubbers such as acrylonitrile-butadiene, carboxylated acrylonitrile-butadiene and styrene-butadiene rubbers; polyacrylate rubbers such as poly(ethyl acrylate) and poly(ethyl acrylatehalogenated vinyl ether-acrylic acid) rubbers; and ethylene copolymers such as ethylene-vinyl acetate rubbers. Other elastomeric polymers having a glass transition temperature about 5° C. can be employed since, other than the low glass transition temperature, there are no other limitations on the identity of the elastomer except for the specific requirements of the particular adhesive being formulated, such as suitable molecular weight, viscosity characteristics and compatability with the other ingredients of the adhesive.

Such elastomeric polymeric materials are particularly beneficial when incorporated in acrylic adhesives comprising at least one olefinically unsaturated polyurethane.

Polymeric materials having an intrinsic viscosity of 0.1 to about 1.3 which are suitable for use in the present invention can be obtained by the polymerization of 1 or more acrylic and nonacrylic monomers, including mixtures thereof. Exemplary polymeric materials include poly(methyl methacrylate/n-butylacrylate/ethylacrylate) (90/5/5%); poly(n-butyl methacrylate/isobutyl methacrylate) (50/50%); poly(n-butyl methacrylate) and poly(ethyl methacrylate). Preferably, the viscosity will be about midway in the recited range.

The use of polymeric materials having such intrinsic viscosities is especially beneficial in acrylic adhesives containing homopolymers and copolymers of 1,3-butadiene.

The acidic compounds which are essential to the practice of this invention can include substantially any organic or inorganic acid having at least one acid group, and includes organic partial esters of such acids. The acidic compounds are in the nature of Bronsted acids, that is, compounds which can donate a proton. Suitable acidic compounds preferably have a $pK_a$ in the range from 0.5 to 6, most preferably in the range from 1.5 to 5. The acidic compounds should also be reasonably soluble in the adhesive compositions of the invention to facilitate homogeneous distribution of the acid throughout the composition. The selection of the acidic component is a function of the substrate to be bonded, as well as the desired adhesive performance, and provides the adhesive chemist considerable latitude in formulating adhesive compositions specifically designed for any particular end use. For example, organic acids, as well as organic partial esters of such acids are preferred for bonding ferrous metals and their alloys, but adhesives containing such organic acids can be prepared according to the invention which are effective bonding agents for non-ferrous metals, such as galvanized steel. Conversely, the inorganic acids, and the organic partial esters of such acids, are preferred for bonding non-ferrous metals and their alloys, but adhesives containing such inorganic acids can also be prepared which are useful for bonding ferrous metals and their alloys. In the general case, acidic compounds which contain both at least one acid group and at least one olefinically-unsaturated moiety are preferred.

Representative acidic compounds which are suitable for use in the practice of the invention include phosphoric acid, 2-hydroxyethyl methacrylate partial ester of phosphoric acid, 2-hydroxyethyl acrylate partial ester of phosphoric acid, phosphoric acid, benzenephosphonic acid, phosphorous acid, sulfuric acid, sulfurous acid, 2-ethylhexonic acid, formic acid, acetic acid, butyric acid, hexanoic acid, naphthenic acid, lauric acid, linoleic acid, valeric acid, toluene sulfonic acid, nitritoluene sulfonic acid, dichloroacetic acid, trichloroacetic acid, phenylacetic acid, sulfosalicylic acid, naphthalene disulfonic acid, acetoacetic acid, acrylic acid, methacrylic acid, aminobenzosulfonic acid, maleic acid, malonic acid, phthalic acid, suberic acid, succinic acid and vinyl acetic acid.

The inorganic acids and organic partial esters of inorganic acids are currently preferred for use with non-ferrous metals such as zinc, copper, cadmium, their alloys and platings, with olefinically unsaturated partial esters of inorganic acids being currently preferred. Adhesive compositions prepared in accordance with this invention which contain such inorganic acids typically provide better adhesion when bonding non-ferrous metals than is obtained from the use of organic acids. Adhesive compositions containing the inorganic acids provide the lower adhesion values with ferrous metal surfaces than is obtained from the use of organic acids; however, the inorganic acid-containing adhesives are sufficiently effective in bonding ferrous metals that they can be utilized in applications such as thread-locking of iron bolts and nuts.

As noted, the organic acids and inorganic partial esters of organic acids are currently preferred for structural bonding of ferrous metals, and can also be used for structural bonding of non-ferrous metals, although the adhesion provided by such adhesive compositions in this latter case is typically less than that provided by the use of inorganic acids.

In the general case, it has been noted that stronger acids, as well as larger quantities of any acid, tend to increase the rate at which the adhesive compositions cure. The use of strong acids, e.g., those having $pK_a$ values of 1 or less, particularly in large amounts, can lead to corrosion problems and tends to deactivate the adhesives, possibly through chelate formation. The use of large amounts of any given acid also tends to give lower adhesion values; but it has been observed that such reductions in adhesion values is not as great when the acidic compound contains one or more polymerizable olefinically unsaturated groups. Thus some degree of experimentation may be required in selecting the acid and the amount of the acid, in order to achieve an acceptable compromise of properties. Currently, it is preferred that the acidic compound be employed in amounts in the range from 0.05 to 20, preferably 0.1 to 15, percent by weight, based on the total weight of the adhesive components (A)–(E), inclusive, as recited, supra. In those cases where the acid does not contain polymerizable moities, the amount of the acid is preferable in the range from 0.05 to 5 percent by weight.

The sulfonyl halide-containing compounds are also essential to the practice of this invention and will be used in an amount in the range from 0.05 to 5, preferably 0.5 to 2, percent by weight, based on components (A)–(E), inclusive, of the compositions. As noted, the halide moiety can be chlorine, bromine or iodine with the sulfonyl chlorides being currently preferred. The sulfonyl halides can be mono- or poly-functional and can be aliphatic sulfony halides having from one to 12 or more carbon atoms, aromatic halides having from 1 to 3 aromatic nuclei and containing from 6 to 24 carbon atoms. Representative sulfonyl halide containing compounds include biphenyl disulfonyl chloride, trichlorobenzene sulfonyl chloride, p-toluene sulfonyl chloride, benzene sulfonyl chloride. hexadecane sulfonyl chloride, diphenyl ether-4,4′-sulfonyl chloride, and the corresponding sulfonyl bromides and iodides. Monomeric sulfonyl halides are currently preferred, with the aromatic sulfonyl halides, particularly p-toluene sulfonic chloride, being especially preferred.

Equally as essential as are the compounds containing at least one sulfonyl group and the acidic compounds, both supra, are compounds containing at least one transition metal. As used herein, transition metals are those metals which have their valence electrons in a "d" subshell. Such metals are found in classes Ib–VII b and VIII on the periodic chart of elements. The preferred metals are copper, zinc. cobalt, vanadium, iron and manganese. The metal should be in a higher oxidation state i.e., the compound must be reducible, with the highest oxidation state being preferred in all cases. The remainder of the compound does not appear to be critical. Whether the transition metal is ionic or cationic in its ionized form also does not appear to be critical. However, when the transition metal forms part of the cation, e.g., meta-vanadate, it is preferred to employ the ammonium salt, e.g., ammonium meta-vanadate. Otherwise, inorganic compounds containing the transition metals can be used, such as the metal salts exemplified by the bromides, chlorides, phosphates, sulfates, sulfides and oxides of the transition metals. Likewise, organic compounds containing the transition metals can be used, such as transition metal salts of organic mono- and poly-caorboxylic acids and mono- and poly-hydroxy compounds, such as cupric acetate, cupric maleate, cupric hexoate, iron naphthate, cobaltous and cobaltic naphthenate and the like. Particularly preferred organic derivatives are sulfamide and sulfonamide compounds which contain the transition metal, such as the currently preferred cupric sacchrinate. This is but a partial listing of suitable inorganic and inorganic salts; however, other useful salts will be readily obvious to those skilled in the art. The transition metal compounds will be employed in the adhesive compositions of this invention in a range from 0.05 to 5, preferably 0.5 to 2.5, percent by weight, based on total weight of adhesive components (A)–(E), inclusive.

The transition metal-containing organic compounds are typically more soluble in the adhesive compositions of this invention, and they are preferred compounds. It is important that the transition metal compound, be it organic or inorganic, has some degree of solubility, either in the adhesive composition itself or in an inert solvent which is preferably compatable with the adhesive compositions. Because of the limited solubility of at least some usable transition metal compounds, it can be advantageous to dissolve the compound in the adhesive or inert solvent and filter off the undissolved material.

The adhesive compositions may also contain stabilizers such as hydroquinone, T-butyl catechol and other well known stabilizers.

Thickeners such as fumed silica are included to thicken the composition for handling and application. A preferred thickener is fumed silica comprising from 0.2 to 10.0 weight percent of the adhesive composition. Pigments also may be added if desired.

The adhesive compositions of the invention are readily prepared by combining the ingredients using any conventional mixing device to obtain a homogeneous mixture.

The adhesive coatings may be brushed, rolled, sprayed, dotted, knifed or otherwise applied to one substrate, but preferably to both substrates in a thickness not to exceed 60 mils. The substrates may be clamped for firmness during care in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding. The two metal surfaces and the interposed composition are maintained in engagement until the said adhesive composition has cured sufficiently to bond the said surfaces.

EXAMPLE I

Polymerizable Acrylic and Methacrylic Ingredients

I-A. A polymer-in-monomer syrup comprises a low molecular weight methylacrylate polymer in a methyl methacrylate monomer. This material contains 38 weight percent polymer and is available from E. I. duPont de Nemours Company under the trade name Elvacite 2008.

I-B. A carboxylated poly(1,3-butadiene/acrylonitrile) is carried in methyl methacrylate monomer. The composition contains 25 weight percent of the polymer.

I-C. A polycaprolactone triol (molecular weight 540) is reacted with toluene diisocyanate in methyl methacrylate. The resulting polyisocyanate-functional prepolymer is capped with hydroxy ethyl methyacrylate so that the resulting olefinically-unsaturated urethane polymer contains pendant methacrylate radicals and is substantially free of unreacted isocyanate radicals. This material corresponds to the product of Example 1 described in U.S. Pat. No. 3,873,640, and contains 65 weight percent of the unsaturated urethane polymer in methyl methacrylate monomer.

EXAMPLE II

Compositions Tested with Galvanized Steel Sheets

Five typical adhesive compositions were prepared employing the polymerizable acrylic ingredients described in Example I-A and I-B. The compositions by weight are set forth in the following Table II (there is no Table I) along with the lap shear strength of a surface-to-surface bond after 24 hours. The lap shear test is carried out by using two galvanized steel coupons having a thickness of about 60 mils and a surface area of about 1"×3". The coupons are lapped for a distance of 1" and a film of the adhesive composition is applied to each surface. The surfaces are allowed to rest (without clamping pressure) for 24 hours before the lap shear test is carried out. The lap shear test determines the tension (measured in pounds per square inch) required to rupture the adhesive bond.

TABLE II

ADHESIVE COMPOSITIONS TESTED WITH GALVANIZED STEEL SHEETS

| Adhesive Ingredients | II-A | II-B | II-C | II-D |
|---|---|---|---|---|
| | | Parts by Weight | | |
| I-A Composition | 100 | — | — | — |
| I-B Composition | — | 100 | 100 | 100 |
| p-toluene Sulfonyl Chloride | 2 | 2 | 2 | 1 |
| Methacrylic Acid | 10 | 10 | 10 | 2 |
| Copper Saccharinate | 1 | 1 | 1 | 0.5 |
| Zinc Saccharinate | — | — | — | — |
| HEMA Phosphate* | — | — | 10 | 2 |
| Methyl Methacrylate | — | — | — | 10 |
| Results of 24 Hour Lap Shear Test (PSI) | 180 | 180 | 1220 | 1030 |

*HEMA Phosphate is the beta-hydroxy-ethyl methacrylate monoester of phosphoris acid.

The data clearly show the concept of the invention, and demonstrate the higher adhesion values which inorganic acids provide with non-ferrous metals such as galvanized steel. The data also demonstrate the suitability of employing mixtures of inorganic and organic acidic compounds.

TABLE III

The following adhesive compositions are prepared according to the formulations of Table III

| Example II Ingredients, parts by weight | III-A | III-B | III-C | III-D | III-E | III-F | III-G |
|---|---|---|---|---|---|---|---|
| I-B compositions | 25 | 25 | 25 | 25 | 25 | 25 | 25 |
| I-C compositions | 25 | 25 | 25 | 25 | 25 | 25 | 25 |
| Methacrylic acid | 0 | 5 | 5 | 5 | 0 | 0 | 0 |
| HEMA Phosphate | 0 | 0 | 0 | 0 | 0 | 5 | 5 |
| p-Toluene Sulfonyl Chloride | 1.0 | 0 | 1 | 1 | 0 | 1 | 1 |
| Cupric sacchrinate | 1.5 | 1.5 | 0 | 1.5 | 1.5 | 0 | 1.5 |
| Silica | 16 | 16 | 16 | 16 | 16 | 16 | 16 |

TABLE III-continued

The following adhesive compositions are prepared according to the formulations of Table III

| Example II Ingredients, parts by weight | III-A | III-B | III-C | III-D | III-E | III-F | III-G |
|---|---|---|---|---|---|---|---|
| Lap shear, psi, 20 hours | | | | | | | |
| Cold rolled steel | 100 | 0 | 100 | 1500 | — | — | — |
| Galvanized steel | 50 | — | — | — | 0 | 100 | 2750 |

The compositions are employed to bond solvent-wiped cold rolled steel and galvanized steel parts, following the procedure of Example II. Lap shear testing is performed following the procedure set forth in Example II. The results are reported in Table III.

The data clearly show that the presence of the acidic compound, the sulfonyl chloride-containing compound and the reducible metal-containing compound is essential to the practice of the invention. Some degree of polymerization is seen with compositions III-C and III-F, which do not contain any reducible metal-containing compounds. As can be seen by the results obtained with compositions III-D and III-G, this low order of polymerization (compositions III-C and III-F) is clearly outside the scope of the current invention, since these compositions do not provide acceptable levels of adhesion, even for thread-locking. However, the data from these formulations (compositions III-C and III-F) does demonstrate the contribution of active metal surfaces in accordance with the invention, particularly when taken in concert with the results of Example XI, infra.

water for the two-weeks period. The results of the tests show a tensile failure strength as set forth below:

| Environment | Failure (psi) |
|---|---|
| Room Temperature | 2633 |
| Salt Spray | 1433 |
| 100 percent Relative Humidity | 1600 |
| Water Soak | 1900 |

The adhesive composition IV-A thus exhibits outstanding resistance to conventional degradation test environments.

Composition IV-B is useful for bonding galvanized steel and zinc phosphate treated metals. The composition also has utility as a thread locking adhesive. Full cure of the adhesive requires several hours. The composition has a viscosity of about 8,500 cps and a density of about 9.15 pounds per gallon.

Composition IV-D is useful for bonding steel surfaces but is particularly useful in bonding copper and brass. The adhesive develops handling strength in about 25

TABLE IV

TYPICAL ADHESIVE COMPOSITIONS

| Example IV Ingredients | IV-A | IV-B | IV-C | IV-D | IV-E | IV-F | IV-G | IV-H |
|---|---|---|---|---|---|---|---|---|
| I-A composition | 150 | 150 | — | 150 | 150 | — | 150 | — |
| I-B composition | 150 | 150 | 50 | 150 | 150 | 360 | 150 | 50 |
| I-C composition | — | — | — | — | — | 75 | 75 | 75 |
| HEMA Phosphate | 15 | 15 | 5 | — | — | 7.5 | 7.5 | 7.5 |
| Methacrylic Acid | — | — | 5 | 80.7 | 80.7 | — | — | — |
| Methyl Methacrylate | — | — | — | 89 | 89 | — | — | — |
| Copper Saccharinate | 4.5 | 4.5 | 1 | — | — | — | — | — |
| Cupric Acetate | — | — | — | 20.2 | — | — | — | — |
| Copper Salt of p-Toluene Sulfonamide | — | — | — | — | — | 2.2 | — | — |
| Copper Salt of Salicylamide | — | — | — | — | — | — | 2.2 | — |
| Cupric Chloride | — | — | — | — | — | — | — | 2.2 |
| p-Toluene Sulfonyl Chloride | 3.0 | 3.0 | 2 | 20.2 | 20.2 | — | — | — |
| Fumed Silica | 3.0 | 3.0 | — | 8 | 8 | — | — | — |
| Molywhite 212* | — | 17.1 | — | 8 | 8 | — | — | — |
| Carbon Black | — | — | — | — | 4.08 | — | — | — |
| DDBQ*** | — | — | — | — | — | — | — | — |

*Molywhite 212 is a mixture of calcium molybdate (3 volumes) and zinc phosphate (2 volumes) deposited on an inert substrate.
***DDBQ is dichlorodihydroxy benzoquinone, 0.01 percent by weight in methacrylic acid.

Composition IV-A is useful for bonding galvanized steel, zinc phosphate treated metals and cadmium. It has particularly utility as a thread locking adhesive. Metal parts bonded with Composition IV-A are fully cured in several hours. The composition has a viscosity of about 8,000 cps and a density of about 8.6 pounds per gallon.

A number of lap shear test specimens were prepared from G-90 galvanized steel coupons with adhesive IV-A. The coupons were exposed to various test environments for two weeks. One set of coupons was maintained at room temperature for the two-week period; another set was maintained in a salt spray cabinet for two weeks; another set was maintained at 100 percent relative humidity; and another set was maintained under minutes. The composition is a viscous liquid having a density of about 8.8 pounds per gallon. Lap shear tests with cold-rolled steel coupons show a strength exceeding 2000 psi.

Composition IV-E is useful as an adhesive for steel but may also be used with copper. Full cure requires several hours. The composition is a viscous black liquid because of the carbon black. The composition has a density of about 9.0 pounds per gallon.

Compositions IV-F, IV-G and IV-H were subjected to a lap shear test (galvanized steel bonded to galvanized steel). Composition IV-F developed a wiggle cure in seven minutes and an overnight shear strength of 2193 psi (average of four tests). the four hour strength of the composition was 500 psi. Composition IV-G developed a wiggle cure in ten minutes and an overnight strength of 2233 psi (average of four tests). Composition IV-G developed a four hour strength of 1900 psi. Composition IV-H developed a wiggle cure in one hour and an overnight strength of 2167 psi (average of four tests).

EXAMPLE V

Thread-Lock Tests

The adhesive composition of Example IV-A was applied as a thread locking adhesive with a zinc plated screw and bolt, a cadmium plated screw and bolt and a black iron screw and bolt. The zinc plated screw and bolt was ⅜" diameter. The cadmium plated bolt was 5/16" diameter. The black iron bolt was 5/16" diameter and, as received and tested, had a protective coating of surface oil. The bolts were coated with the composition IV-A and the nuts were threaded onto the bolts to approximately the middle of the bolt. A wiggle test was carried out to determine time required before the bolt and nut were initially secured and would not move easily. In addition a 24-hour torque test was carried out to determine the amount of torque required to turn the nut with respect to the bolt after 24-hour set. The results of the test are presented in the following Table V.

TABLE V

| THREAD LOCK TEST AND WIGGLE CURE TEST COMPOSITION IV-A | | |
|---|---|---|
| | Wiggle Cure Time | 24-HR Torque Inch-lbs |
| Zinc plate bolt ⅜ inch | 10 minutes | 45 |
| Cadmium plate bolt 5/16 inch | 10 minutes | 25 |
| Black iron bolt 5/16 inch | 4 hours | 25 |

EXAMPLE VI

Lap Shear Tests with Galvanized Steel

A series of lap shear tests was carried out with galvanized steel coupons employing the adhesive composition of Example IV-B. Each of the lap shear test specimens was exposed to a different environment for ten days and the shear failure was measured in pounds per square inch. The first specimen was maintained at room temperature and failed at 2,473 psi. The second specimen was maintained under a salt spray exposure and failed at 2,407 psi. The third specimen was maintained in a 100 percent relative humidity chamber and failed at 2,373 psi. The fourth specimen was maintained at 70° C. and failed at 2,733 psi.

EXAMPLE VII

Thread Lock Exposure Tests

Zinc plated bolts, ⅜" diameter, were coated with the adhesive compositon of Example IV-B and fitting nuts were threaded onto the coated bolts. The nuts and bolts were exposed to various environments for two weeks and thereafter the torque required to release the nuts was measured.

1. Heat/Cold Test — The bolts were maintained at 70° C. for two and one-half hours and thereafter at −29° C. for two and one-half hours immediately prior to the torque test. This torque was 11 foot pounds.

2. The nuts and bolts were maintained in boiling water for one hour prior to the torque test. The required torque was 11 foot pounds.

3. The nuts and bolts were maintained in a salt spray cabinet throughout the entire two week period. The torque was 12 foot pounds.

4. The nuts and bolts were maintained at 100 percent relative humidity for two weeks. The torque was 11 foot pounds.

5. The nuts and bolts were soaked in water throughout the entire two week period. The torque was 11 foot pounds.

6. The nuts and bolts were maintained at 70° C. throughout the entire two week period. The torque required was 22 foot pounds.

7. The nuts and bolts were maintained at room temperature for the entire two week period. The torque was 12 foot pounds.

EXAMPLE VIII

Lap Shear Tests

Lap shear tests were carried out with various metal coupons including galvanized steel, brass, copper, magnesium, aluminum (2029-53 alloy) and steel. The adhesive was Composition II-A. The results of the lap shear tests are shown in the following Table VIII.

TABLE VIII

| LAP SHEAR TESTS - COMPOSITIONS II-A | | |
|---|---|---|
| | Failure - PSI | |
| Metal | 2.5 Hours | 24 Hours |
| Galvanized Steel | 250 | 300 |
| Brass | 600 | —* |
| Copper | 300 | —* |
| Magnesium | 0 | 0 |
| Aluminum (2024-T5) | 0 | 0 |
| Steel | 0 | 200–300 |

*Not Measured

EXAMPLE IX

Lap Shear Tests

The adhesive composition IV-C is an example of a strong acid medium adhesive composition particularly useful with zinc, copper and cadmium surfaces. This composition IV-E was applied to galvanized steel coupons (i.e., zinc surfaces) to carry out lap shear tests to illustrate the speed of cure. The results of the lap shear tests are set forth in the following Table IX.

TABLE IX

| LAP SHEAR TESTS GALVANIZED STEEL COMPOSITION IV-C | |
|---|---|
| Time (Minutes) | Failure - PSI |
| 5 | 20 |
| 10 | 60 |
| 20 | 186 |
| 30 | 360 |
| 45 | 560 |
| 60 | 700 |

EXAMPLE X

Lap Shear Tests

The adhesive compositions IV-A, IV-B, IV-D, IV-E and IV-G were applied to galvanized steel, bare carbon steel, aluminum (6061-T6) alloy, cadmium plated metal, copper, brass coupons and a lap shear test was carried out in accordance to ASTM 1002-79. All coupons were prepared by solvent wiping. The bonding area was a 1" overlap of two strips with an adhesive thickness 0.005 inch. After 24 hours, the lap shear tests were carried out with the results set forth in the following Table X.

TABLE X

| | LAP SHEAR TESTS, 24 HOURS, PSI AT FAILURE | | | | |
|---|---|---|---|---|---|
| | Adhesive Composition | | | | |
| Metal Coupons | IV-A | IV-B | IV-E | IV-F | IV-H |
| Galvanized Steel | 2500 | 2470 | 200 | 213 | 2000 |
| Bare Steel | 200 | 20 | 2793 | 2467 | * |
| Aluminum (6061-T6) | 1100 | * | 733 | * | * |
| Aluminum (2024-T3) | 107 | * | * | * | * |
| Cadmium Plate | 1067 | 800 | 1833 | 2100 | 2250 |
| Copper | 867 | 1347 | 2833 | 767 | 900 |
| Brass | 433 | 1133 | 567 | 400 | 800 |
| Galvaneal (Steel) | 1233 | 1197 | 200 | 200 | 1153 |

*Indicates no cure

EXAMPLE XI

Plastic Sheet Tests

In order to demonstrate that the present compositions are activated upon contact with an appropriate metal surface, each of the adhesive compositions in Table II and Table III are applied between two plastic sheets (polyethylene terephthalate). The compositions remain fluid and did not cure.

EXAMPLE XII

The adhesive compositions reported in Table XII are prepared. The compositions are employed to bond cold rolled steel (CRS) and galvanized steel (GS) assemblies following the procedure of Example II. Lap shear tests are performed according to the procedure of Example II and the results are reported in Table XII.

TABLE XII

| Adhesive Ingredients, parts by weight | XII-A | XII-B | XII-C | XII-D | XII-E |
|---|---|---|---|---|---|
| | | | Parts by Weight | | |
| I-B Composition | 30 | 30 | 30 | 50.2 | 50.0 |
| I-C Composition | 30 | 30 | 30 | 50.2 | 50.0 |
| Methyl Methacrylate | — | — | — | 29.8 | — |
| Acetic acid | — | — | — | 6.8 | — |
| Methacrylic acid | — | — | — | — | — |
| Phosphoric acid | — | — | — | — | 5.0 |
| HEMA Phosphate | 3 | 3 | 3 | — | — |
| p-toluene sulfonyl chloride | 0.6 | 0.6 | 0.6 | 6.8 | 1.5 |
| Saccharin | 0.9 | — | — | — | — |
| Sodium saccharin | — | 0.9 | — | — | — |
| Cupric sacchrinate | — | — | 0.9 | 0.7 | 1.5 |
| Substrate | GS | GS | GS | GS | GS |
| Lap shear, psi, 24 hours | 353 | 760 | 2440 | Adh | Adh |
| Failure | CM | CM | Adh | Adh | Adh |
| Cure consistency | Soft | Soft | Hard | Hard | Hard |

I claim:

1. An ambient temperature-curable adhesive composition consisting essentially of, in admixture
   (A) at least one liquid olefinically unsaturated monomer;
   (B) at least one polymeric material selected from the group consisiting of
      (1) at least one olefinically unsaturated urethane reaction product of at least one isocyanate functional prepolymer and at least one hydroxy-functional monomer having at least one unit of polymerizable olefinic unsaturation, such reaction product being characterized by the presence of at least two units of olefinic unsaturation and the substantial absence of free isocyanate groups;
      (2) at least one butadiene-based elastomeric polymeric material selected from the group consisting of
         (a) homopolymer of butadiene;
         (b) copolymer of butadiene and at least one monomer copolymerizable therewith selected from the group consisting of styrene, acrylonitrile, methacrylonitrile and mixtures thereof;
         (c) modified elastomeric polymeric material selected from the group consisting of butadiene homopolymer and copolymer as previously defined, such homopolymer and copolymer having been modified by copolymerization therein by trace amounts up to 5 percent by weight, based on weight of modified elastomeric material, of at least one functional monomer; and
         (d) mixtures thereof;
      (3) at least one homopolymer of copolymer of at least one olefinically unsaturated monomer selected from the group consisting of styrene and alkyl or hydroxyalkyl esters of acrylic and methacrylic acid, said ester having one to 18 carbon atoms in the alkyl moiety; and
      (4) mixtures of such polymeric materials;
   (C) a Bronsted acid compound having at least one organic or inorganic acid group and a pKa in the range from 0.5 to 6;
   (D) at least one compound containing at least one sulfonyl halide group having the structure

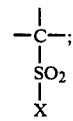

wherein X is selected from the group consisting of chlorine, bromine, or iodine; and
   (E) at least one reducible compound containing at least one metal selected from the elements of classes Ib, IIb, IIIb, IVb, Vb, VIb, VIIb or VIII on the periodic chart of the elements.

2. An adhesive composition according to claim 1 wherein the amount of said olefinically unsaturated monomer (A) is in the range from 10 to 90 percent by weight; the amount of said olefinically unsaturated urethane reaction product (B)(1) is in the range from 10 to 90 percent by weight; the amount of said butadiene-based elastomeric polymeric material (B)(2) is in the range from 1 to 30 percent by weight; the amount of said homopolymer or copolymer of at least one of styrene and esters of acrylic or substituted acrylic acids (B)(3) is in the range from 2 to 60 percent by weight; the amount of said acidic compound (C) is in the range from 0.05 to 20 percent by weight; the amount of said sulfonyl halide-containing compound (D) is in the range from 0.05 to 5 percent by weight; and the amount of said metal compound (E) is in the range from 0.05 to 5 percent by weight; said weight percents being based on the total weight of ingredients (A)–(E), inclusive.

3. An adhesive composition according to claim 2 wherein said acidic compound is selected from the group consisting of inorganic acids and organic partial esters of inorganic acids.

4. An adhesive composition according to claim 2 wherein said acidic compound is selected from the group consisting of organic acids and organic partial esters of organic acids.

* * * * *